United States Patent [19]

Rumble

[11] Patent Number: 4,524,934
[45] Date of Patent: * Jun. 25, 1985

[54] PIPE HANGER

[75] Inventor: Ray M. Rumble, Canfield, Ohio

[73] Assignee: Michigan Hanger Company, Inc., Hubbard, Ohio

[*] Notice: The portion of the term of this patent subsequent to Dec. 18, 2001 has been disclaimed.

[21] Appl. No.: 556,777

[22] Filed: Dec. 1, 1983

Related U.S. Application Data

[63] Continuation of Ser. No. 381,077, May 24, 1982, , which is a continuation-in-part of Ser. No. 257,599, Apr. 27, 1981, abandoned.

[51] Int. Cl.³ ............................................. F16L 3/00
[52] U.S. Cl. .......................................... 248/62; 248/59
[58] Field of Search ............... 248/59, 58, 62, 63, 248/316 A; 403/326, 329

[56] References Cited

U.S. PATENT DOCUMENTS

| | | | |
|---|---|---|---|
| 1,898,898 | 2/1933 | Rowley | 248/62 |
| 2,158,802 | 5/1939 | Redlon | 248/62 |
| 2,621,906 | 12/1952 | Guilder | 403/326 |
| 2,893,670 | 7/1959 | Adams | 248/59 |
| 4,166,600 | 9/1979 | Perjes | 248/59 |
| 4,247,147 | 1/1981 | Rettkowski | 403/326 |
| 4,305,557 | 12/1981 | Kowalski | 248/59 |
| 4,306,696 | 12/1981 | Pondman | 248/59 |

FOREIGN PATENT DOCUMENTS 592837 11/1977 Switzerland ............................. 248/62

Primary Examiner—William H. Schultz
Assistant Examiner—Ramon O. Ramirez
Attorney, Agent, or Firm—Harpman & Harpman

[57] ABSTRACT

A pipe hanger arranged to be positioned about a pipe to be suspended, moved to closed position and engaged upon a threaded support rod so as to carry the pipe is disclosed. The hanger takes the form of an elongated band preferably metal, the ends of which are brought into proximity to one another by bending the band into a general oval shape, the ends of the band are formed in configurations registering with the thread pattern of the support rod when engaged thereagainst and a ferrule is moved downwardly over the ends of the band so as to move the same into forceful engagement with the threaded supporting rod. Locking devices on the ferrule engage at least one of the ends of the band and/or the support rod so as to hold the ferrule in a position in which the ends of the band remain in tight non-slipping engagement with the threaded support rod.

7 Claims, 6 Drawing Figures

4,524,934

PIPE HANGER

This is a continuation of my U.S. patent application Ser. No. 381,077, filed May 24, 1982 which was a continuation-in-part of my patent application Ser. No. 257,599, filed Apr. 27, 1981, abandoned.

BACKGROUND OF THE INVENTION

1. Technical Field

This invention relates to pipe hangers of the type normally employed to suspend pipes from overhead supports in spaced relation thereto.

2. Description of the Prior Art

Prior structures of this type have generally taken the form of a band arranged in a vertically disposed oval shape with its ends apertured and arranged in superimposed position over a flanged cylindrical coupling which in turn is internally threaded for threaded engagement with a support rod and as illustrated in U.S. Pat. No. 2,996,274.

Proposals have been made to alter the usual pipe hanger constructions by clampingly engaging the pipe carrying portion of the pipe hanger on a support rod or on a fastener carried by a support rod and such constructions may be seen in U.S. Pat. Nos. 1,642,131, 1,937,654, 1,924,353, 2,452,186, 2,762,592, 3,493,206 and 4,166,600.

Swiss Pat. No. 592,837 discloses a strap which can be positioned around a pipe with the ends of the strap arranged in oppositely disposed relation against the sides of a threaded support rod with a tubular member positioned thereover and held in desired position by a threaded nut engaging the threaded rod and rotated downwardly thereon against the tubular member.

The present invention and its several modifications differ from the prior art in providing simple structures which are less expensive to manufacture and are easier to install than the prior art devices and particularly in the arrangement of the end configurations of the band in the areas where they engage the threaded rod and more particularly in the novel configurations in the ferrules which form locking devices which may be quickly and easily installed over the ends of the band to secure the same in clamping relation on the support rod.

SUMMARY OF THE INVENTION

An improved pipe hanger is disclosed which is formed of only two pieces which are engagable with a threaded support rod to form a complete pipe hanger. The pieces comprise an elongated band such as formed of sheet metal or metal strapping with end configurations defining arcuate shapes which are internally threaded or knurled and arranged to be positioned against the outer opposite sides of a threaded support rod and wedged thereagainst by the application of a ferrule thereover which is resilient and/or distortable or provided with configurations formed integrally therewith which automatically engage the ends of the band and/or the support rod when the ferrule is moved downwardly over the ends of the band on the threaded rod to tightly clamp and lock the assembly in desired pipe supporting position.

DESCRIPTION OF THE PREFERRED EMBODIMENT

Figure 1:
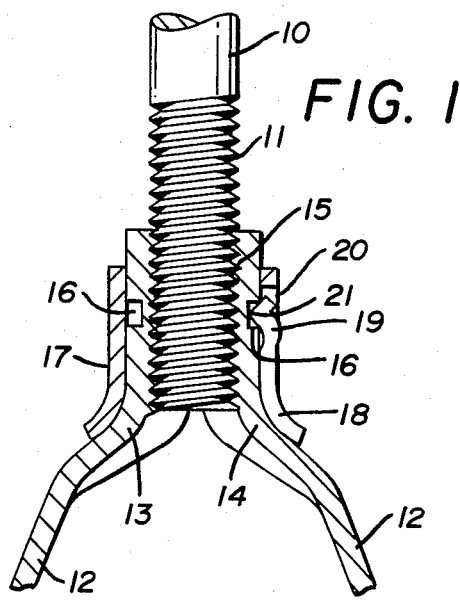
FIG. 1 is a cross sectional view with parts broken away and parts in cross section showing a pipe hanger and a support rod.

By referring to FIG. 1 of the drawings, it will be seen that a support rod 10 having a threaded lower end section 11 is illustrated and those skilled in the art will observe that such support rods are common in the pipe hanger art and are usually affixed at their upper ends to an over head support such as a beam or the like usually be way of a clamp, not shown.

An elongated sheet metal strap 12 comprises the portion of the pipe hanger which is positioned around a pipe to be supported thereby. The elongated strap 12 is formed in an oval shape in a vertical plane to hold the pipe and has its end portions 13 and 14 formed in oppositely disposed arcuate configurations, each of which are slightly less than half circular shapes. The inner surfaces of the arcuate end portions 13 and 14 are each provided with thread patterns 15 or the like and the outer surfaces of the arcuate end portions 13 and 14 are provided with transversely arranged grooves 16 inwardly of the upper ends of the arcuate end portions 13 and 14.

As illustrated in FIG. 1 of the drawings, the arcuate end portions 13 and 14 are shown held in tight frictional engagement with the threaded portion 11 of the support rod 10 by a ferrule 17 which is resilient and distortable and which has a slightly outturned lower annular edge 18.

Still referring to FIG. 1, it will be seen that a tab 19 is formed in the cylindrical body of the ferrule 17 by an inverted U-shaped slot 20 and the tab 19 outlined thereby is then shaped so that its upper end has an inwardly directed transversely positioned sharp edge 21 adapted to snap into one of the grooves 16 when the ferrule 17 is moved downwardly over the arcuate end portions 13 and 14 of the strap 12 in position against the threaded portion 11 of the support rod 10. The inherent resiliency and distortability of the ferrule 17 and the tab 19 enable the same to register with one of the grooves 16 in snap-in like engagement when the lower slightly flanged edge 18 of the ferrule 17 is slightly distorted by its engagement with the oppositely outturned portions of the end portions 13 and 14 forming the oval shape of the strap 12.

Figure 2:
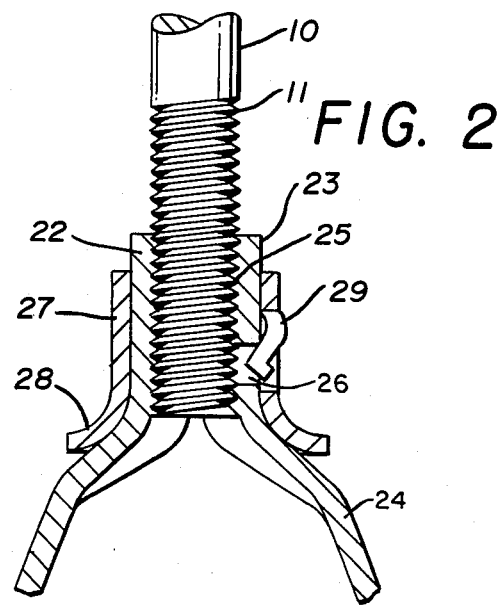
FIG. 2 is a cross sectional view with parts broken away and parts in cross section showing a modified pipe hanger.
Figure 3:
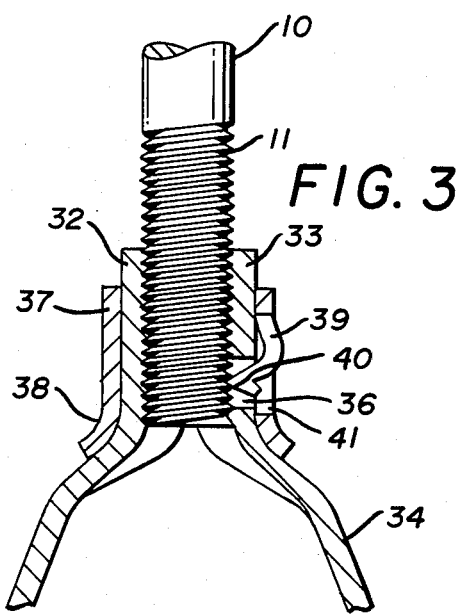
FIG. 3 is a cross sectional view with parts broken away and parts in cross section showing a further modification of a pipe hanger.

Modifications of the pipe hanger illustrated in FIG. 1 of the drawings and hereinbefore described may be made and two such modifications are illustrated in FIGS. 2 and 3 respectively.

By referring to FIG. 2, it will be seen that the support rod 10 with its threaded lower end 11 is shown engaged by arcuately shaped ends 22 and 23 of an oval shaped one-piece pipe hanger strap 24. The inner surfaces of each of the arcuate shaped ends 22 and 23 are roughened as by providing the same with thread patterns 25 or the like and knurling is an acceptable alternate.

Figure 4:
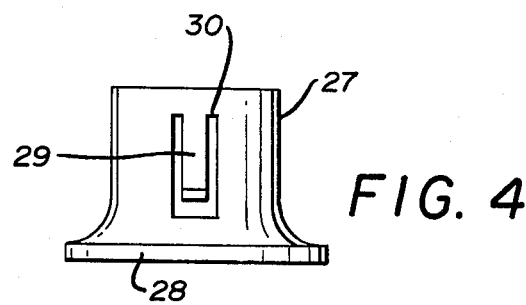
FIG. 4 is a side view of the ferrule seen in FIGS. 2 and 3.

An opening 26 is formed in at least one of the arcuate shaped end portions 22 and 23 of the strap 24 and a ferrule 27 having a slightly outturned lower edge portion 28 is provided with an integral tab 29 which is formed in the ferrule 27 by a U-shaped slot 30 as also seen in FIG. 4 of the drawings. The tab 29 is shaped so that it will extend substantially into the opening 26 in either one or both of the arcuately shaped end portions 22 and 23 of the pipe hanger strap 24.

The assembly illustrated in FIG. 2 of the drawings is arranged by positioning the ferrule 27 on the upper portion of the support rod 10 placing the strap 24 around the pipe to be supported moving the arcuately shaped end portions 22 and 23 thereof into engagement with the threaded portion 11 of the support rod and then moving the ferrule 27 downwardly thereover in a forcible action which will cause the lower outturned portion 28 of the ferrule 27 to engage the outturned portions of the end portions 22 and 23 and enable the integral inturned tab 29 to snap into the opening 26 thus tightly clampingly engaging the end portions 22 and 23 of the strap 24 on the support rod and thus forming a highly satisfactory pipe hanger.

A further variation of the pipe hanger may be seen in FIG. 3 of the drawings and by referring thereto it will be seen that a support rod 10 having a threaded lower end section 11 is shown clampingly engaged by oppositely disposed arcuate end portions 32 and 33 of a one-piece oval-shaped pipe hanger strap 34. At least one of the arcuately shaped end portions 32 and 33 of the strap 34 has an opening 36 formed therein and a ferrule 37 having a lower outturned annular flange 38 is provided with an elongated tab 39 having a sharpened end 40 which is formed from the material of the ferrule 37 by a U-shaped slot 41 therein quite similar to the arrangement shown in FIG. 4 of the drawings and hereinbefore described.

The elongated tab 39 is of a sufficient length that its sharpened end 40 will extend through the opening 36 in one or the other of the arcuate shaped ends 32 and 33 of the pipe hanger strap 34 and engage the thread pattern 11 of the support rod. The ferrule is resilient as is the elongated tab 39 so that when the ferrule 37 is moved downwardly over the arcuate shaped ends 32 and 33 of the pipe hanger strap 34, the same are tightly clamped against the threaded portion 11 of the support rod 10 and the configuration of the end 40 of the elongated tab 39 enables it to first move into the opening 36 and then engage the thread pattern 11 to hold the ferrule in clamping engagement in the assembly.

Figure 5:
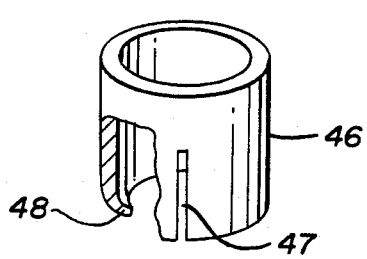
FIG. 5 is a perspective view of an alternately shaped ferrule that may be used in the pipe hanger seen in FIG. 6.
Figure 6:
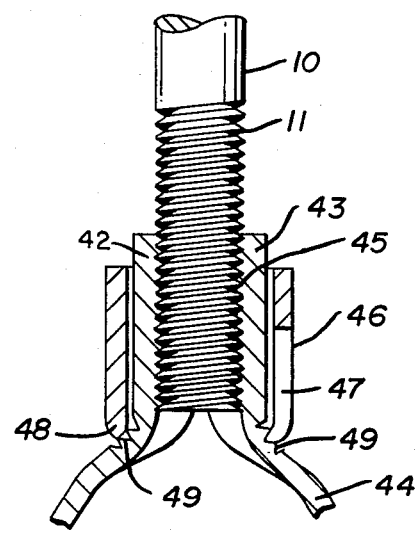
FIG. 6 is a cross sectional view with parts broken away and parts in cross section showing a modified pipe hanger and the locking ferrule of FIG. 5.

By referring now to FIG. 6 of the drawings, a further modification of the pipe hanger disclosed herein may be seen and wherein the support rod 10 with its threaded lower end portion 11 is shown engaged by oppositely disposed arcuately shaped end portions 42 and 43 of a one-piece oval shaped pipe hanger strap 44. The inner surfaces of the arcuately shaped end portions 42 and 43 are roughened as by knurling or the like 45, and simulated thread pattern configurations serve equally well so that they will frictionally engage the thread pattern 11 of the support rod 10 when a cylindrical ferrule 46 is positioned forcefully downwardly thereover. The ferrule 46 is shown in a perspective view in FIG. 5 of the drawings and it is provided with at least one vertical slot 47 extending upwardly therein from a lower inturned annular edge 48, the innermost portion of which is tapered to form a sharpened split ring configuration which is adapted to snap into oppositely disposed V-shaped grooves 49 formed in the outer opposite surfaces of the shoulder portions of the pipe hanger strap 44 immediately below the arcuately shaped end portions 42 and 43 and as illustrated in FIG. 6 of the drawings.

It will thus be seen that an improved extremely simple and inexpensive pipe hanger has been disclosed which is formed of only two pieces, the oval shaped pipe hanger strap and the ferrule, which is resilient and distortable and adapted to slide downwardly over the end portions of the pipe hanger strap when the same are positioned on the opposite sides of a support rod so as to support a pipe positioned through the oval shaped strap of the pipe hanger. The simple constructions are easy to form on automatic machinery and are thereby quite inexpensive when compared with pipe hanger constructions heretofore known in the art and more importantly the pipe hanger and its variations shown in this disclosure are extremely simple to install, all of which results in considerable savings in manufacturing costs in producing the pipe hanger and labor expense in installing the pipe hangers at a job site.

Although several embodiments of the present invention have been illustrated and described, it will be apparent to those skilled in the art that various changes and modifications may be made therein without departing from the spirit of the invention and having thus described my invention what I claim is:

I claim:

1. An improvement in a pipe hanger which pipe hanger includes a strap which may be bent and positioned about a pipe to be suspended, the ends of said strap arranged to be moved to positions adjacent one another and secured to a threaded support rod, the improvement comprising means for securing said ends of said strap to said threaded support rod, said means consisting of end portions on said strap shaped to engage the opposite sides of said threaded support rod, and a ferrule movable coaxially of said support rod over said end portions of said strap so as to move said end portions against said threaded support rod in non-slipping engagement therewith, and means for locking said ferrule in said position against said end portions, said locking means consisting of inter-engaging snap-in resilient configurations formed in said ferrule and in at least one of said end portions of said strap, said ferrule and locking means being integrally formed of resilient metal.

2. The improvement in a pipe hanger set forth in claim 1 and in which said resilient configurations include transversely positioned grooves formed in the outer surfaces of said end portions of said strap and wherein said ferrule includes a distortable spring-like tab therein having an end engagable in one of said grooves.

3. The improvement in a pipe hanger set forth in claim 2 wherein sad grooves are formed in substantially half circular shapes in which said movable spring like tab of said ferrule will register.

4. The improvement in a pipe hanger set forth in claim 1 and wherein said locking means consists of an opening formed inwardly of the end of at least one of said end portions of said strap and a U-shaped slit in said ferrule, the material of said ferrule within said U-shaped slit defining an arm, a portion of which is arranged for registry with said opening.

5. The improvement in a pipe hanger set forth in claim 1 and wherein said locking means consists of an opening formed inwardly of the end of at least one of said end portions of said strap and a U-shaped slit in said ferrule, the material of said ferrule within said U-shaped slit defining an arm, a portion of which is arranged for registry with said opening and extends therethrough for registry with said threaded support rod.

6. The improvement in a pipe hanger set forth in claim 1 and wherein said locking means consists of said ferrule formed with an inturned sharpened lower annular split edge and sharply defined transversely positioned grooves in said strap adjacent said end portions arranged for registry with said sharpened inturned annular split edge of said ferrule when the same is moved downwardly against said strap in the area of said grooves.

7. The improvement in a pipe hanger set forth in claim 1 and wherein said ferrule is of an overall length relative to the length of said end portions of said strap so that one end of said ferrule forecefully engages portions of said strap adjacent said end portions thereof when said resilient configurations are inter-engaged.

* * * * *